US008949601B2

(12) United States Patent
Schmid

(10) Patent No.: US 8,949,601 B2
(45) Date of Patent: Feb. 3, 2015

(54) COMMUNICATION SYSTEM FOR PROVIDING THE DELIVERY OF E-MAIL MESSAGE

(75) Inventor: Volker Schmid, Blumberg (DE)

(73) Assignee: Regify AG, Hufingen-Behla (DE)

( * ) Notice: Subject to any disclaimer, the term of this patent is extended or adjusted under 35 U.S.C. 154(b) by 1860 days.

(21) Appl. No.: 12/159,621

(22) PCT Filed: Dec. 29, 2006

(86) PCT No.: PCT/EP2006/012605
§ 371 (c)(1),
(2), (4) Date: Sep. 3, 2008

(87) PCT Pub. No.: WO2007/073943
PCT Pub. Date: Jul. 5, 2007

(65) Prior Publication Data
US 2009/0172399 A1    Jul. 2, 2009

Related U.S. Application Data

(60) Provisional application No. 60/754,729, filed on Dec. 29, 2005.

(30) Foreign Application Priority Data

Dec. 29, 2005 (EP) .................................... 05028663

(51) Int. Cl.
*H04L 9/32* (2006.01)
(52) U.S. Cl.
USPC ........................................................ 713/168

(58) Field of Classification Search
USPC ........................................................ 713/168
See application file for complete search history.

(56) References Cited

U.S. PATENT DOCUMENTS

| 6,158,003 A | 12/2000 | Kara | |
| 6,460,073 B1 * | 10/2002 | Asakura | 709/206 |
| 6,904,521 B1 * | 6/2005 | Jivsov | 713/155 |

(Continued)

FOREIGN PATENT DOCUMENTS

| CA | WO02071719 A1 | 12/2002 |
| IL | WO9817042 | 4/1998 |

OTHER PUBLICATIONS

Press, J., An Introduction to Public Key Systems and Digital Signatures, ICL Technical Journal 6 Nov. 1989, No. 4, Oxford, Great Britain, pp. 681-693.

(Continued)

*Primary Examiner* — Esther Benoit
(74) *Attorney, Agent, or Firm* — Robert A. Blaha; Smith Risley Tempel Santos LLC

(57) ABSTRACT

A communication system comprising a sender unit, a recipient unit and a control unit, wherein the sender unit is adapted to generate an electronic message, to send the electronic message directly to the recipient unit, and to send a sending information message to the control unit indicating that the sender unit has sent the electronic message to the recipient unit, wherein the recipient unit is adapted to receive the electronic message directly from the sender unit and to send a receipt information message to the control unit, the receipt information message indicating that a user of the recipient unit has received the electronic message.

13 Claims, 2 Drawing Sheets

(56) References Cited

U.S. PATENT DOCUMENTS

2002/0004902 A1 1/2002 Toh et al.
2003/0011810 A1 1/2003 Strobel et al.
2005/0021963 A1 1/2005 Tomkow
2005/0038863 A1* 2/2005 Onyon et al. ................ 709/207

OTHER PUBLICATIONS

Davies, D.W. et al., The Application of Digital Signatures Based on Public Key Cryptosystems, International Conference on Computer Communication, Atlanta, Oct. 27-30, 1980; pp. 525-530.

* cited by examiner

COMMUNICATION SYSTEM FOR PROVIDING THE DELIVERY OF E-MAIL MESSAGE

This application claims the benefit of the filing date of European Patent Application No. 05028663 filed Dec. 29, 2005 and of U.S. Provisional Patent Application No. 60/754,729 filed Dec. 29, 2005, the disclosure of which is hereby incorporated herein by reference.

The invention relates to a communication system.

The invention further relates to a communication method.

Moreover, the invention relates to a program element.

Further, the invention relates to a computer-readable medium.

Beyond this, the invention relates to a sender unit.

Furthermore, the invention relates to a recipient unit.

Moreover, the invention relates to a control unit.

In modern times, electronic communication becomes more and more popular.

US 2005/0021963 A1 discloses a system for and a method of, proving the transmission, receipt and content of a reply to an electronic message. A server receives a message from a sender and transmits the message to a recipient. The server receives from the recipient an attachment as an indication of the opening of the message at the recipient and relating to the message route between the server and the recipient. The server transmits to the sender the message and the attachment and their encrypted digital fingerprints and expunges the transmitted information. To subsequently authenticate the message and the attachment, the sender transmits to the server what the server has previously transmitted to the sender. The server then prepares a digital fingerprint of the message and decrypts the encrypted digital fingerprint of the message and compares these digital fingerprints to authenticate the message. The server performs the same routine with respect to the attachment and the encrypted digital fingerprint of the attachment to authenticate the attachment.

It is an object of the invention to enable an efficient communication.

In order to achieve the object defined above, a communication system, a communication method, a program element, a computer-readable medium, a sender unit, a recipient unit and a control unit according to the independent claims are provided.

According to an exemplary embodiment of the invention, a communication system is provided comprising a sender unit, a recipient unit and a control unit, wherein the sender unit is adapted to generate an electronic message, to send the electronic message directly to the recipient unit, and to send a sending information message to the control unit indicating that the sender unit has sent the electronic message to the recipient unit, wherein the recipient unit is adapted to receive the electronic message directly from the sender unit and to send a receipt information message to the control unit, the receipt information message indicating that a user of the recipient unit has received the electronic message.

According to another exemplary embodiment of the invention, a communication method is provided, the method comprising generating an electronic message by means of a sender unit, sending the electronic message from the sender unit directly to a recipient unit, sending a sending information message from the sender unit to a control unit indicating that the sender unit has sent the electronic message to the recipient unit, receiving, by means of the recipient unit, the electronic message directly from the sender unit, and sending a receipt information message from the recipient unit to the control unit, the receipt information message indicating that a user of the recipient unit has received the electronic message.

According to still another exemplary embodiment of the invention, a program element is provided, which, when being executed by a processor, is adapted to control or carry out a communication method having the above mentioned features.

According to yet another exemplary embodiment of the invention, a computer-readable medium is provided, in which a computer program is stored which, when being executed by a processor, is adapted to control or carry out a communication method having the above mentioned features.

According to still another exemplary embodiment of the invention, a sender unit is provided, wherein the sender unit is adapted to generate an electronic message, to send the electronic message directly to a recipient unit, and to send a sending information message to a control unit indicating that the sender unit has sent the electronic message to the recipient unit.

According to another exemplary embodiment of the invention, a recipient unit is provided, wherein the recipient unit is adapted to receive an electronic message directly from a sender unit and to send a receipt information message to a control unit, the receipt information message indicating that a user of the recipient unit has received the electronic message.

According to still another exemplary embodiment of the invention, a control unit is provided, wherein the control unit is adapted to receive a sending information message from a sender unit, the sending information message indicating that the sender unit has sent the electronic message to a recipient unit, and to receive a receipt information message from the recipient unit, the receipt information message indicating that a user of the recipient unit has received the electronic message The communication according to embodiments of the invention can be realized by a computer program, that is by software, or by using one or more special electronic optimization circuits, that is in hardware, or in hybrid form, that is by means of software components and hardware components.

According to an exemplary embodiment of the invention, a communication scheme is provided between a sender unit, a recipient unit and a control unit. The sender unit and the recipient unit exchange communication messages under the control of the control unit. In this context, the sender unit sends an electronic message directly, that is to say without any instance in between, to the recipient unit for receipt. This may allow for a simple and fast communication procedure. However, for control and security purposes, the sender unit indicates to the control unit the transmission of the electronic message to the recipient unit. Furthermore, the recipient unit may confirm receipt of the electronic message by returning a corresponding message to the control unit. The control unit may then report the sender unit that (and under which circumstances, e.g. at which time) the electronic message has been opened by a user of the recipient unit. By taking these measures, all information concerning the communication (e.g. identification information, timing information, encryption information, etc.) may be centrally stored, evaluated and managed in the control unit which has a proper overview over the circumstances of the communication.

This may allow for a secure, fast and user-friendly communication system. By sending the electronic message directly from the sender to the recipient without an indirection over the control unit, the necessary storage capacity and processing resources may kept small. Furthermore, the "triangle" system may be operated in a safe manner, since the transmission paths for the actual message and for a decryption key may be separated.

The term "direct" may particularly describe a communication between the sender unit and the recipient unit which does not need any instance in between so that the electronic message may be transmitted between the location of the sender and the location of the recipient without any other intermediary services. Thus, it may be possible that the directly transmitted message is routed by nodes of a communication network, but is usually not processed (e.g. stored and forwarded) by any intermediate instance. Thus, it is possible that no intermediate instance takes the message in possession.

Such a system may particularly allow to provide a user-friendly electronic registered mail system, which may make it possible with a single computer mouse click to generate an electronic registered mail with a reception confirmation feature. Thus, the system may combine in a simple manner the advantages of a traditional postal registered mail with the cost and time benefits of electronic communication. For the sender of a confidential email, the sending is very easy, and the same holds for the recipient when opening this personal electronic registered mail.

Furthermore, it is possible that the sender and/or the recipient works with a conventional email service, without any modification necessary on the basis of the user interface. For instance, the system may be compatible with conventional email management systems like Microsoft Outlook™.

Thus, it is possible for the sender to simply send messages with a high degree of reception control. Particularly, an encrypted transfer may improve the security level when sending a confidential message. A time and cost advantage can be obtained by the sender. Furthermore, the sender interface may be independent of a mail program or a network provider.

When transmitting such a message by means of an email to a recipient, the recipient may simply open the message, for instance with a conventional reader like the Acrobat Reader™. The transfer may be encrypted and the time and cost advantages may also be obtained for the recipient. Furthermore, also the operation at the recipient side may be independent of a particular mail program or a network operator.

Coming back to the sender, the system according to embodiments of the invention ensures that the recipient takes knowledge of the important electronic message of the sender. The sender receives an automatic confirmation and has therefore the possibility to react in accordance with a corresponding degree of urgency.

The sender may generate the electronic registered mail as a normal email, for instance using a conventional email client or alternatively a specifically adjusted email client in which the electronic registered mail system may be integrated.

The system may package the email including its attachment automatically in an electronic file which may be encrypted. This file may be sent as a conventional email and may be received by the recipient on a direct way. As soon as the recipient opens the file, the sender may receive a confirmation message including the time at which the recipient has actually opened the message. In case that the email is not opened by recipient within a time period which may be user-defined by the user of the sender unit, an automatic confirmation may be supplied to the sender.

The recipient may receive the electronic registered mail as an email and is therefore enabled to efficiently work with this email. By opening the attached container file by the recipient, the sender may automatically take knowledge that the important message has been received by the recipient and that the recipient has taken note of the message.

The recipient may receive the electronic registered mail electronically in the form of a common email. However, this common email may have an attachment including the file transmitted from the sender. For instance, double clicking on an attachment item may automatically start a reader application, for instance a shareware reader or the Acrobat Reader™.

The reader may open automatically and may decrypt the attachment. The contents of the electronic message are now available for the recipient. By opening the electronic message, the recipient automatically initiates transmission of a receipt confirmation message so that the sender may take note of the receipt of the electronic message by the recipient.

The transmission of the electronic message may be performed starting from the sender unit and reaching the recipient unit. The transport of the electronic message may be free from any intermediate instance, particularly may be performed via a transmission path which does not include the control unit. The transport may be purely electronic (for instance by means of an email sent from the sender unit to the recipient unit), may be purely non-electronic (for instance by generating a hardcopy of the message by printing it by the sender unit, transporting the hardcopy physically to the recipient unit, and scanning the message again into an electronic form at the location of the recipient unit), or may be partially electronic (for instance by copying the message on an USB stick, transporting the USB stick physically to the recipient unit, and copying the message from the USB stick to a storage unit of the recipient unit). However, the control unit may be provided—functionally and/or physically—outside of a transmission path of transmitting the message between sender and recipient. The control unit may then serve as a coordinating and/or authentifying instance, but does not contribute to the transmission of the electronic message itself. Consequently, a provider of the service system may become independent from any particular transmission channel, and the flexibility of the system may be improved. The electronic message may be transmitted in any manner, for instance as an MMS or by a USB stick or a flash memory card.

It may be desired that the electronic message is received by a desired recipient which may also be denoted as an "addressee". However, it may happen that the actual recipient which may also be denoted as the "recipient" differs from the addressee. In such a scenario the non-authorized recipient may be prevented from an access to the content of the electronic message by decrypting the electronic message and by providing a user with a necessary decryption key only after proper authentification.

The communication scheme according to an exemplary embodiment of the invention may also be implemented via a (for instance wired or wireless) telecommunication network. In such a scenario, sender unit and/or recipient unit may be a telephone, for example a mobile phone.

It is also possible to integrate one or more RFID tags in the communication system.

According to an exemplary embodiment, the container file may include, in addition to the message, a further software attachment. When accessing the container file on the recipient's side, for instance by double clicking, the message may be opened and, simultaneously, the software attachment may be executed. This may trigger an installation of a corresponding software component on the recipient unit. For instance, a reader required for presenting the message may be installed. Additionally or alternatively, a registration window may be opened allowing the recipient to register itself in the communication system, for instance via a communication with the control unit.

Concerning a registration of sender and/or recipient before using the communication system, utilization of the system may require that both communication partners have registered beforehand. Alternatively, it may be possible that the registration of a single communication partner may be sufficient to enable the exchange of a communication message between these two communication entities.

In a scenario in which fees are requested for using the system, it is possible that one of the two communication participants bears the entire costs. Or, the sender entity may bear the costs for sending a message, whereas receipt of the message is free. Or, the recipient entity may bear the costs for receiving a message, whereas sending the message is free.

Next, further exemplary embodiments of the communication system will be explained. However, these embodiments also hold for the communication method, for the computer-readable medium, for the program element, for the sender unit, for the recipient unit and for the control unit according to the independent claims. The sender unit may be adapted to send the electronic message to a plurality of recipient units. Thus, one message may be sent to more than one recipient, and therefore the message may be transmitted a plurality of times. Particularly, the different transmission processes may be performed individually and independently or separately from one another. By taking this measure, properties of the individual messages may be adjusted in a different manner, for instance a degree of urgency which may differ for different recipients.

The sender unit may be adapted to generate the electronic message based on electronic data provided by a user of the sender unit. For instance, such electronic data may be a text or audio content or video content which is input by the user of the sender unit, for instance via a keypad, a computer mouse, a track ball, a microphone, a memory cartridge or via a graphical user interface (GUI) of the sender unit or to be coupled with the sender unit.

Furthermore, the sender unit may be adapted to generate the electronic message as an encrypted electronic message by encrypting the electronic data. Encrypting the electronic message, for instance by means of a conventional encryption mechanism, may improve the level of security of the transmission of a confidential message.

The sender unit may further be adapted to generate the electronic message as an email including an attachment being based on the electronic data. Thus, the sender unit may have software installed thereon which is capable of processing the electronic data so that an email may be sent from the sender unit to the recipient unit having as an attachment file the processed electronic data. Such an attachment may have a particular extension (for instance ".rgf") so that a software installed on the recipient unit may be automatically capable to determine the type of message and, optionally, to automatically open the message based on the information derived from the extension.

The sender unit may further be adapted to generate a hashcode based on the electronic message and/or based on the electronic data. A hashcode may be denoted as a code which includes information like user information and/or timing information and/or transmission information so as to provide a forgery-proof system. Such a hashcode may allow for an unambiguous identification of a document, and thus may allow a unique identification, since it may be some kind of "fingerprint" of the message.

The sender unit may be adapted to send the hashcode to the control unit as at least a part of the sending information message. Therefore, the control unit receives the information necessary to monitor or supervise the entire system so that any misuse can be securely detected and prevented by the control unit.

The sender unit may further be adapted to send a decryption key to the control unit as at least a part of the sending information message, the decryption key being adapted to decrypt the encrypted electronic message. Therefore, by not directly sending the decryption key to the recipient unit, the level of security is further improved. However, since the decryption key is sent to the control unit and the control unit may be brought in communication with the recipient unit, it is possible that the control unit provides the recipient unit with the decryption key so that a triangle system with a high degree of security is obtained.

The sender unit may further be adapted to send to the control unit as at least a part of the sending information message at least one of the information items of the group consisting of sender unit user information, electronic data information and communication information. Therefore, the sending information message may include data like a hashcode, a sender identity, a recipient identity, a subject of the electronic message, an encryption key and any other necessary information.

The sender unit may further be adapted to synchronize the sending of the electronic message directly to the recipient unit and the sending of the sending information message to the control unit. For instance, the electronic message and the sending information message may be sent from the sender unit to the respective destinations essentially simultaneously in time, so that a fast transmission of the message(s) can be ensured.

The sender unit may be adapted to generate the electronic message as a compressed electronic message by compressing the electronic data. By using a compression algorithm, like any conventional compression algorithm, the amount of data to be transmitted between the three entities may be reduced so that the transmission velocity may be increased and the computational burden of the entire system may be significantly reduced.

The sender unit may be adapted to initiate a communication with the control unit by sending an authentication message to the control unit before sending the sending information message. By such an authentification to be performed between the sender unit and the control unit, misuse of the system can be securely prevented since only authentication code or the like may allow the sender unit to initiate a communication with the control unit, and only in this case a transmission of a decryption code from the control unit to the recipient unit may be triggered.

The sender unit may further comprise a software element including an email client application. Therefore, the software to be installed on the sender unit may be completely autarkic from any existing system, and the conditions of such an email client application may be selectively defined so as to optimize the electronic registered mail system.

However, it is alternatively also possible that the sender unit comprises a software element which is embedded in or which is to be embedded in a conventional email client application. Therefore, it is possible to just install an additional component on an existing email client application like Netscape Navigator™, Outlook™ or the like so that only slight modifications are necessary to enable a user to simultaneously use a known software client application and to have additionally the opportunity to send a registered mail by means of an electronic message.

Beyond this, the sender unit may be adapted to notify an event that a user of the recipient unit has accessed the electronic message. Therefore, the sender may be directly informed as soon as possible when the recipient unit has read the electronic message and therefore receives a receipt similar as in case of a conventional postal registered mail, however in electronic form and thus with a significantly increased velocity.

The sender unit may further be adapted to notify an event that a user of the recipient unit has not accessed the electronic message during a time interval exceeding a predetermined threshold time interval of, for instance one day, one week, or one month. It is also possible that a user may define such a time interval, or such a time interval may be prestored in the system. After expiry of this threshold time interval, the sender may be actively informed that the recipient has not opened the message yet, so that the sender can use this information or may contact the recipient to inform the recipient that an urgent or important message should be read.

The recipient unit may be adapted to, upon receipt of an access command of a user of the recipient unit, provide access to the electronic message to the user of the recipient unit. Such an access command may be a double click on a computer mouse or any other command which may be provided by a user of the recipient unit to the recipient unit via a user interface.

However, the recipient unit may further be adapted to, upon receipt of the access command, send an authentication message to the control unit prior to providing access to the electronic message. Therefore, to improve the security of the system and to provide a forgery-proof system, any misuse may be prevented when the recipient unit authentificates itself at the instance of the control unit before being allowed to open the electronic message.

This may be achieved by sending a decryption key from the control unit to the recipient unit only upon receipt of the (correct) authentication message from the recipient unit. Therefore, it can be ensured that the recipient unit can only open the encrypted electronic message based on the decryption key which is only provided to the recipient unit by the control unit after successful authentication.

Moreover, the recipient unit may be adapted to provide access to the electronic message by decrypting the electronic message by means of the decryption key.

The control unit may further be adapted to send, upon receipt of the receipt information message, a confirmation message to the sender unit, the confirmation message indicating that a user of the recipient unit has accessed and has taken note of the electronic message. This confirmation message may inform the sender that the message has arrived at the recipient's side and has been opened/read by the recipient.

The sender unit and the recipient unit may be adapted for a direct communication with one another without any intermediate entity there between. Therefore, a fast, easy and error-robust system may be provided which is very user-friendly since no time and computational resource intensive consuming instance has to be installed between the sender unit and the recipient unit.

At least one of the sender unit, the recipient unit and the control unit may comprise at least one of the group consisting of a server computer, a client computer, a desktop computer, a laptop computer, a personal digital assistant, and a mobile phone. Therefore, the different entities are each adapted to communicate via any electronic device, and is not restricted to conventional computers.

The communication system may be further adapted for a communication of the sender unit and/or of the recipient unit and/or of the control unit via a communication network, particularly via at least one communication network of the group consisting of the Internet, an intranet (for instance in a company), a WLAN (wireless local area network), and a mobile communication network. Therefore, the electronic registered mail system according to embodiments of the invention is not restricted to any particular communication network, but may be installed in the context of any desired wired or wireless communication system.

The use of the communication system may be enabled to a user of the sender unit and/or of the recipient unit against a fee.

The control unit may comprise a first control entity (which may be a first provider unit) communicatively coupled to the sender unit (which may be a client of the first provider unit) in a manner that a transmission of a sender message from the sender unit to the first control entity is indicative of an identity of the sender unit. The control unit may comprise a second control entity (which may be a clearing unit) communicatively coupled to the first control entity. The first control entity may be adapted to forward the sender message (i.e. not the (encrypted) electronic message to be transmitted from the sender unit to the recipient unit, but an auxiliary message including content such as (decryption) key information, hash code, etc.) to the second control entity in a manner that the second control entity is not aware of (i.e. does not know) the identity of the sender unit. Thus, a provider may communicate with the sender unit in a manner that the provider knows the identity of a user of the sender unit. However, in contrast to this, a communication between the first control entity and the second control entity regarding the sender unit may be anonymous so that the identity of the sender unit will not be known to the second control entity. However, a transaction history indicating any communication (including time stamps, etc.) between the first control entity and the second control entity may be stored in both entities in a manner that any individual communication can be retraced and identified later. Thus, when considering both transaction histories, it will be possible to unambiguously reconstruct any communication including the identity of the sender unit stored in the first control entity, if necessary. This concept may allow for a transparent communication history and may make it dispensible for the first control entity to provide the second control entity (and/or a third control entity) with confidential information regarding the sender unit, i.e. regarding their client(s).

The sender message may be the sending information message, particularly may be the sending information message comprising a decryption key adapted to decrypt the encrypted electronic message. Thus, the second control entity/clearing unit may handle a transaction of a key required by the recipient unit for decrypting the electronic message in an anonymous manner.

The control unit may comprise a third control entity (which may be a second provider unit) communicatively coupled to the recipient unit (which may be a client of the second provider unit) in a manner that a transmission of a recipient message between the recipient unit and the third control entity is indicative of an identity of the recipient unit. The third control entity may be communicatively coupled to the second control entity. The third control entity may be adapted to exchange data with the second control entity in a manner that the second control entity is not aware of (i.e. does not know) the identity of the recipient unit. Thus, a provider may communicate with the recipient unit in a manner that the provider knows the identity of a user of the recipient unit. However, in contrast to this, a communication between the third control entity and the second control entity regarding the recipient unit may be anonymous so that the identity of the recipient unit will not be known to the second control entity. However, a transaction history indicating any communication between the third control entity and the second control entity may be stored in both entities in a manner that any communication can be retraced later. Thus, when considering both transaction histories in combination, it will be possible to reconstruct any communication including the identity of the recipient unit stored in the third control entity, if necessary. This concept may allow a transparency of the communication history and may make it dispensible for the third control entity to provide the second control entity (and/or the first control entity) with confidential information regarding the recipient unit, i.e. regarding their client(s).

The recipient message may be at least one of the group consisting of the receipt information message and a decryption key adapted to decrypt the encrypted electronic message.

Thus, a sender user wishing to send an electronic message as anonymous as possible to a recipient user may disclose his identity only to his provider server, namely the first control entity. The first control entity may then store the identity of the sender user and may forward an anonymous message being free of the identity of the sender user to the second control entity. This may allow the sender user to remain anonymous for the system with the exception to the first control entity. Such a system may be ideal for a clearing system.

A secure communication between the sender user and the recipient user via their respective provider servers, namely the first control entity and the third control entity, is possible. Only the first control entity and the third control entity are aware of an identity of their respective client (sender user/recipient user), whereas neither the messages exchanged among the control entities are indicative of the identity of the respective user nor the second control entity is aware of the identity of the respective user.

Such a communication system may be configured as an anonymous transaction management system, particularly as an anonymous clearing system. Such a clearing system may allow to manage transactions anonymously and enable a multi-provider business with e-mail transactions across providers.

Additionally or alternatively, at least one of the group consisting of the sender unit, the recipient unit, and the control unit may be adapted for preventing accessibility to information included in the electronic message in case that a predetermined attachment to the electronic message is lacking. For instance, such an expected attachment being a requirement for a successful transaction and decryption of the electronic message may be an enforcing document attachment. This may allow the communication system to enforce attachments such as digital signatures thereby ensuring legally binding communication. For example, the sender unit may allow start of the transmission of the electronic message only when a special attachment is attached to the electronic message or may automatically attach the attachment to the electronic message without giving a user the option to prevent such an attachment. Additionally or alternatively, the recipient unit may reject the electronic message when the special attachment to the electronic message is missing. Additionally or alternatively, the control unit may reject delivering a key needed by the recipient unit to decode the electronic message when the special attachment to the electronic message is missing.

Particularly, the sender unit may be adapted for mandatorily attaching a predetermined attachment to the electronic message. In other words, without a user of the sender unit having an opportunity to decide whether the message shall be sent with or without the attachment, the attachment may be automatically attached to the message by the sender unit. Thus, the sender unit may force the attachment to be attached to the message. When a recipient gets access to the message, she or he can immediately see the attachment of the user such as an electronic certificate. This may ensure that no message may be sent without an authorization of the sender.

The predetermined attachment may comprise at least one of the group consisting of an identification of a user of the sender unit, an authentication of a user of the sender unit, an obligation of a user of the sender unit, and a logo characterizing a user of the sender unit. Those attachments or certificates may include rights and/or restrictions maintained by the organizations of which the user is a member, for example for orders or some competence restrictions of the user, such as "user is allowed to buy goods up to a value of . . . ".

In the following, a procedure of ensuring a reliable authorization according to an exemplary embodiment of the invention will be described. This embodiment may be implemented in a scenario in which it is of particular importance that a user of the sender unit is a specific person with high reliability.

In such an embodiment, the user of the sender unit may be invited to provide an additional piece of identification information such as a telephone number, a copy of her or his passport, etc. The system may then verify the correctness of the additional piece of identification information, for instance may call the user of the sender unit using the provided telephone number. This contact procedure may be performed by a human activity or completely automated. If the verification procedure is successful, i.e. when the provided additional piece of identification information turns out to be true or the identity is verified, the system may provide the identified user with access data to an identity file such as a key usable for communication via a communication system according to an embodiment of the invention. For instance, the user may be provided with a password which she or he can input on an Internet page. Upon input of such a password, the sender unit may be supplied, from an Internet page, with an identity file comprising identification information of the user. This identity file may be used for subsequent communication with a recipient and may form the basis for a notification to a recipient of a message sent from the identified user to the recipient unit that the user of the sender unit has been identified appropriately.

The term "container-file" may particularly denote any file including contents of an email, for instance in an encrypted manner. The container-file may contain a message body and may include different management information. The container-file may have a particular extension (for instance ".rgf") so that a reader application may automatically recognize which kind of message is present and is to be displayed or presented.

A "creator" may be provided in the system which may allow a user to generate an email which can then be sent according to embodiments of the invention. Such a creator may operate independently of a particular email program. It is possible to use the creator in addition to the generation of the emails when no separate email program is needed. Requirements for using such a creator is just an access to a network like the Internet and an email account. Such a creator may use a special port of the TCP/IP internet protocol or the common known SSL standard for secure connections. For instance, such a creator may use port 8080 of the TCP/IP internet protocol.

Furthermore, a "reader" may be provided as a read and display tool for container-files. It may be used as a standard display tool for files with the extension ".rgf". In order to use such a reader any communication network access may be advantageous, for instance an Internet access, and a corresponding user account or member account. Such a reader may use a special port of the TCP/IP internet protocol or the common known SSL standard for secure connections. For instance, also this reader may use port 8080 of the TCP/IP internet protocol.

"AES245" or "Blowfish" may particularly be denoted as encryption methods which may be used for encrypting the data and the electronic message in the container-file. The communication via the Internet may be encrypted via "AES245" or Blowfish.

"Hashcodes" may particularly be denoted as fingerprints of a file or of a text. The assignment of a file to a calculated hashcode may be unambiguous. By means of a calculated hashcode it is possible to determine whether anything has been modified in a file between the generation with a creator and the reading with a reader. When the hashcodes are identical, the file is identical.

An "attachment" may be a file attached to an email. When sending an email the attachment may comprise the container-file.

The term "key" may denote a password used to encrypt or decrypt data or text. Thus, this password may be used for encrypting and decrypting. The key length may be selected in such a manner so that a desired degree of security is obtainable.

Apart from the data of the container-file, also the communication with the server or control unit may be encrypted. In this context, it is possible to calculate a new key for each connection (for instance Diffie-Hellmann key exchange) with which the communication may be encrypted.

Each sent or received mail may comprise an assigned reminding term. When the email is not received or confirmed within this term, the sender may receive a message concerning the non-access of the email to the recipient.

It is possible to distinguish particularly between two kinds of memberships in the system, namely user account and member account. The user account may allow for reception of mails. It may be free of charge. The member account may further allow the sending of mails and may be provided only against a fee.

In the following, a system for and a method of monitoring the sending, receipt and integrity of an e-mail message according to an exemplary embodiment of the invention will be described in more detail.

Next, an overview over the system will be given.

This system is designed to provide a service for registered (or certified) delivery of information via e-mail. This service, using system and method as described below, shall facilitate delivery of registered e-mail for both the sender and recipient and reduce complexities in comparison to known services. This system eliminates the need to take possession of an e-mail for transport from sender to addressee. This is achieved as it leverages existing e-mail services which sender and receiver have already in use. This automatically eliminates all provisions which otherwise would have to be taken to ensure proper handling of an e-mail in possession.

The system and method can be summarized as follows:

A sender may want to send an e-mail to an addressee and may compile this e-mail and send it using an ordinary email service. The ordinary sending and receiving process may be synchronized with a new process. Upon sending, the process may encrypt the e-mail, resulting into an e-mail with a specific attachment, and may send encryption information (e.g. hashcode) and the e-mail address of the addressee to a server. Upon receiving of the e-mail through the regular e-mail service of the recipient, the process may recognize the specific e-mail (e.g. ".rgf" attachment), may calculate a hashcode on the specific e-mail, and may transmit the hashcode and information on the recipient to the server.

The server may compare "sent" and "received" hashcodes and recipient/addressee information and upon positive match, may send a key to recipient. A recipient key and special reader program may decrypt the e-mail and may give access to the content of the e-mail.

Next, the sending process will be explained in more detail.

The sender may create an e-mail. Upon start of the send process, a special program (creator) may be invoked. The creator-program may merge the content of the e-mail into a file (container-file). The content may include attached files, text messages and other information. The content in this container-file may get encrypted using a common encryption algorithm. Optionally, the container-file can be compressed using a common compression-algorithm. The encryption-key may be generated by a random algorithm. Then, a hashcode may be calculated for the complete container-file. The creator may use a common hashcode algorithm like SHA-256. Thereafter, the creator may contact the server to authentificate the sender (e.g. username/password) using a secure and encrypted transmission protocol. Upon authentication, the creator may transmit the hashcode of the container-file, the encryption key and other information to the server. In case of successful transmission of this data to the server, the container-file may be available to be sent to the addressee using the ordinary e-mail program and account of the sender. The container-file may be an ordinary attachment to a generic e-mail.

The creator-program may be designed to support a range of alternatives of composing and sending an e-mail:

1. Using the creator as an e-mail client does not require another e-mail client (such as Outlook). The creator may allow a sender to compose a complete e-mail.

2. Using the creator with commandline-parameters. Thus, it is possible to embed the creator into other programs (for example Microsoft™-Outlook™, Novell™ Groupwise™ or Mozilla Thunderbird™ and many others).

Monitoring receipt of the e-mail may include automatic notification of the sender in case recipient has not (or recipients have not) opened the email within the time specified by sender.

In the following, the receiving process will be described in more detail.

The container-file may be received as an ordinary attachment to an e-mail. By opening the container-file (doubleclick for instance) or other methods (such as commandline-parameters), the recipient may start the reader (which may be available as free download). This may be an automatic process as the reader may be associated with the ending of the container-filename. The reader may contact the server to authenticate the recipient (username/password) using a secure and encrypted transmission protocol. Upon authentication, the reader may calculate the hashcode of the received container-file and may transmit this hashcode, accompanied with other information, to the server. The server may check this hashcode against the hashcode that had been calculated by the creator as part of the sending process. If both hashcodes as well as the destination e-mail address (recipient=addressee) match, the server may transmit the encryption key to the reader. This key may be needed to decrypt the content of the container-file. After transmission of the key, the server may send an e-mail to the sender of the container-file to indicate that the addressee received the message and successfully opened it. Upon positive match, the reader may decrypt the content, thereby providing access to the files and other information inside the container-file.

This receiving process may be advantageous, since authentification of the recipient may ensure that only the addressee as stipulated by the sender will get access to the e-mail.

The following prerequisites should be in place for the recipient to get access to the content of the e-mail:

the recipient should be in possession of the not-manipulated container-file.

the recipient should have a user-account or member-account in the server-database of the service.

the recipient's e-mail address should be unique and the service should make sure that an e-mail address can be registered only once.

Hashcodes may provide the following advantages:

it is possible that a container-file is only accepted by the server if the container-file is not-manipulated.

integrity of container-file: identical hashcodes for sent and received container-file mean that received container-files and contents are identical to sent container-files and contents.

Encrypted transfer may provide security, since the encryption and hashing algorithm may be a commonly used algorithm, also used for digital signatures by military and government.

Next, user registration will be explained.

Before a user can send an e-mail using the service, it is possible that the user has to be known by the server. It is possible that there has to be an entry in a kind of user-database. This entry can be created manually by an administrative person or, preferred, using a website that allows the user to sign-up as a member of the service. Such a website may offer additional services for the members such as administering the user-account and tracking and tracing of all the transactions.

Such a process may have the following advantages:

The sender may monitor receipt of the sent e-mail (certified mail). Encrypted transfer of the complete content (attachments and other information) may be possible. Integrity of content (only a container-file with correct hashcode will trigger the correct key) may be ensured. The e-mail may be sent in a usual way (through sender's provider and sender's e-mail account). Compatibility with other mail services like digital signature may be obtained. The service provider may have only a limited transfer (about 1 KB per complete transaction for key- and hashcodes and other information but not the e-mail and attachments). Compatibility with other methods like digital signatures or encryption processes may be achieved. The process may work world-wide without frontiers. An easy integration in common e-mail processes is possible. Service does not have to bother about legal requirements that emanate from possession of e-mail. Consequently, all technical provisions to fulfil these requirements can be avoided. The system may render legal evidence.

Next, details concerning the container-file according to an exemplary embodiment of the invention will be described.

A container-file (or container) may be a single file, containing the full content of an e-mail, the attached files, messages and other information necessary for a secure and certified e-mail transfer. An e-mail may comprise one or more recipients of the message, the sender, the subject, the message body (the text written as message to the recipient), and attachments (other files attached to the message for transfer).

With the process, the message body and the attachment(s) may be put into a container-file. This container-file may then be attached to the e-mail.

A container-file may comprise two parts, namely the Container-Header and Binary encrypted data.

The Container-Header may contain every information necessary for transferring and decoding the binary data in the second part of the file. In addition, the Container-Header may provide data to ensure the authentication against the server and to display readable information to the recipient.

In fact, the complete header may be not encrypted (except the body-message). Every file may be encrypted or compressed separate so extraction of a single file is faster. Every field inside the Container-Header may be divided by a Line-Feed-Character (&H0A). The divider between the entry-headers may be the PIPE-character (&H7C)

The following table illustrates an exemplary Container-Header:

| Field | Description | Example-Content |
| --- | --- | --- |
| Identifier | The first two letters in a container-file are EM. This stands for »Encrypted e-mail content«. | »EM« |
| Addressee | The e-mail address of addressee | »alice@inter.net« |
| Sender | The full name or company-name of the sender | »V. Schmid Inspirant Germany« |
| CreationDate | Date and time of the creation of the container-file. This time stamp is the date/time the creation computer is running on and not a certified date! | »2005/11/16 10:32:54« |
| CreationUser | The PC-username of the creating person. This is the logon-name of the computer, the creator worked while creation. | »VolkerSchmid« |
| Message *) | The encrypted body-message. This is plain ASCII-text encrypted with the container-file key. The text is stored HEX-encoded to avoid bothering chars. | »7ECAC0DA2C5D6B94C69 CE884F395C70 . . . « |
| FileCount | Number of contained files | »8« |
| Entry 1 | A single entry for every file | see Entry-Header |
| Entry n | A single entry for every file (n = FileCount) | see Entry-Header |
| EndCode | A single ASCII-255 char. | &HFF |
| Files *) | Binary, encrypted and compressed data defined in the Entry-Headers | — |

*) Encrypted data. Files may be also compressed.

The following table illustrates an exemplary Entry-Header (for each Entry-element of the Container-Header) Values divided by PIPE (&H7C)

| Field | Description | Example |
|---|---|---|
| Filename | The filename of the stored file | „Rechnung.pdf" |
| CP | Indicates, if the file is stored in compressed mode. If the value is „0", compression is not used. „1" stands for standard ZIP compression. Other compression methods may follow. | „0" |
| Offset | Offset in bytes for the beginning of the file data. The offset is additional to the position of the first binary data-byte (one byte behind the last ASCII-255 char of the header). | „1234" |
| Length | Length of the file data in bytes. | „16384" |

In the following, an exemplary embodiment of a Transfer Protocol will be explained in more detail.

This document may describe the transfer of data between the creator program, the reader program and the server (providing the service), which server may also be denoted as control unit.

A purpose is that this protocol may describe the complete transfer between the programs involved in the service for registered e-mail.

Referring to involved programs, there are particularly three programs using this protocol, but more applications are possible:
creator (program to create container-files and optionally send them as e-mail using SMTP)
reader (program to open and decrypt container-files)
server (the server located on a dedicated internet-host providing the functions to register an e-mail with an attached container-file or receive the key to decrypt a container-file. This server may comprise a database and logical functions for securing and logging of transactions.)

The implemented protocol may comprise four parts:
1. Initialisation (initializes a secure connection between the creator and the server or between the reader and the server)
2. Authentification (authentificates the user of the creator or reader against out server-database)
3. Create a new message-transaction (registering a new container-file in the server-database. Used by the creator-program.)
4. Request a key (requests a key to decrypt a container-file. Used by the reader-program.)

Next, a detailed description of the protocol will be given.

An initialisation protocol may initialize a secure connection between the creator and the server or between the reader and the server. It may be needed for every connection between the server and the creator or reader.

At first, a TCP/IP connection between the creator-program and the server or between the reader-program and the server may be established. This may be a standard TCP/IP-connection to a specified IP-address and a mandatory port. Those parameters may be configured in the corresponding program (creator- or reader-program).

The client (creator/reader) may send an initialisation string to the server. This string may contain:
"regify <TAB> G <TAB> P <TAB> Alpha"
<TAB> may mean ASCII-code 9, no blanks.
regify -> may be something like a handshake to ensure the counterpart is a known program
G -> may be a random number for the Diffie-Hellman key exchange protocol
P -> may be a common prime-number for the Diffie-Hellman key exchange protocol
Alpha -> may be the computed Alpha for the Diffie-Hellman key exchange protocol The Diffie-Hellman key exchange is a well known and broadly used algorithm.

The server may compute its own numbers and returns its calculated beta back to the client.

The client and the server may compute a shared key, only known to themselves.

The ensuing communication over this connection may be encrypted using this calculated, shared key.

In case of errors (failed handshake, missing parameters, etc.), a error message may be returned to the sender. The error message may be kept simple, to reduce vulnerability to hacking attempts.

Next, issues related to authentification will be explained in more detail.

This process may authentificate the user of the creator or reader against out server-database. This may be needed for every connection between the server and the creator or reader.

After initialisation, the clients may send a logon request in the following manner:
Login <TAB> Username <TAB> Password <TAB> NTUser <TAB> NTComputer
It is recalled that this transfer may be encrypted.
LogIn -> may define the desired action
Username -> may be the username, i.e. a registered member of the service
Password -> may be the user password
NTUser -> may be the username of the computer, the sender currently uses
NTComputer -> may be the NT-computer name on which the sender is currently logged in The server may compute the hash of the transferred password and may authentificate the user with username and password against the member-database. If the user is not authenticated, an error message like "username unknown" or "wrong password" may be returned. The return code "OK" may trigger the next step.

At this step, the protocol may offer several options. Following options are available:
NewMail to create a new message-transaction
GetKey to retrieve a key for a existing container-file/recipient
GetState to retrieve information about the current member (statistics, active transvers . . . ) This protocol may be enhanced to provide further functions.

Next, it will be described how a new message transfer may be created.

This method may be available upon successful initialisation and authentification. It may allow to create a new transaction for a desired message transfer. This option of the protocol may be used (only) by applications that create a new transaction of a desired message transfer.

The client may send the following message to the server:

NewMail <TAB> Recipient <TAB> Subject <TAB> Hash <TAB> Key <TAB> Days

This transfer may be encrypted.

NewMail -> defines the desired action

Recipient -> may be the recipient mail address of the desired recipient (addressee)

Subject-> may be the subject of the message. This is for ease of identification in transaction-logs Hash -> may be the calculated hashcode of the complete container-file Key -> may be the key needed to decrypt the content of the container-file Days -> may indicate, how many days this transaction will be available for the recipient. This value is also important for the creation of status-mails by the server (After expiration, a "mail not fetched" alert may get sent to the origin of the message transfer, i.e. to the sender).

The server may create a new database entry to create this transaction. Following information may be stored in the database in a transaction table:

Transaction-ID (may be a serial number for each new transaction)

Addressee user-ID (may be available only, if the recipient is already known)

Addressee e-mail address

Sender user-ID

Subject

Hashcode

Key

Start-Date (may be the current server date/time)

Termination-Date (may be the current server-date increased by the number of days for pickup)

Pick-Counter (may increase for every successful pickup of the message)

Sender-IP (may be an IP-address of the sending client computer)

Sender-NT-name (may be the logon name of the user on the client-side)

Sender-NT-computer name (may be the name of the computer of the current user on the client side)

The server may return "OK" to the client. In case of errors, the server may report errors in plain text to client.

Request may be a key for a container-file

This method may be available upon successful initialisation and authentification. It may be used to request the key for decryption of a container-file. Such request can only be made by a client that is an application that wants to open a container-file (reader-program).

The client may send the following message to the server:

GetKey <TAB> Hashcode

It is recalled that this transfer may be encrypted.

GetKey -> may define the desired action

Hashcode -> may be the calculated hashcode of the received container-file

The server may first collect all e-mail addresses available for the currently authentificated client-user (in this case the recipient).

Now, the server may query its database for a transaction which may match both the hashcode and the correct recipient e-mail address. If this fails, the server may stop execution of this function and may return an error message to the client.

Upon positive match of hashcode and e-mail address, the server may retrieve the key from the database.

The server may create a new database entry for archiving a complete transactions. The following values may be stored:

Archive-ID (may be automatically created for each new entry)

Recipient user-ID

Recipient e-mail address

Sender user-ID

Subject

Hashcode

Key

Start-Date (the date, the transaction started. Taken from transaction table)

Termination-Date (the date, this transaction ends as set in transaction table)

Pick-Date (this may be the time the key is picked up)

Sender-IP (may be IP-address of the sending client-computer; out of transaction table)

Sender-NT-name (may be the logon name of the sending user; out of transaction table)

Sender-NT-computername (may be the name of the computer of the sender out of transaction table)

Recipient-IP (may be the IP-address of the client-computer that received the key)

Recipient-NT-name (may be the logon-name of the current user on the client-side)

Recipient-NT-computername (may be the name of the computer of the current user on the client side)

Now, the server may transmit the key in the following Message:

OK <PIPE> Key

It is recalled that this transfer may be encrypted.

OK- > may indicate the correct identification of this message and transaction

<PIPE> may be ASCII-Char 124 (&H7C) to separate the key from OK

Key -> may be the key needed to decrypt the files and content of the container-file The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

Figure 1:
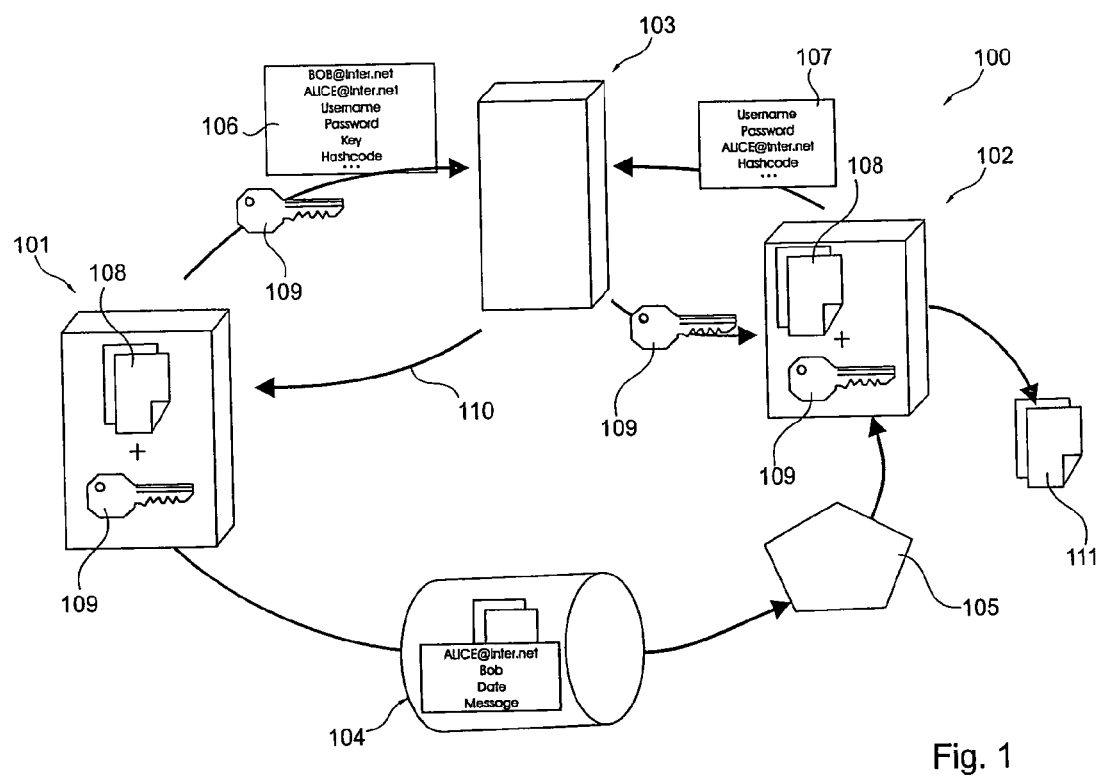
FIG. 1 shows a communication system according to an exemplary embodiment of the invention.

The illustration in the drawing is schematically.

In the following, referring to FIG. 1, a communication system 100 according to an exemplary embodiment of the invention will be described.

The communication system 100 comprises a sender unit 101, a recipient unit 102 and a control unit 103.

The sender unit 101 is adapted to generate an electronic message 104 which may also be denoted as a container-file. Furthermore, the sender unit 101 can send the electronic message 104 directly to a mail client 105 of the recipient unit 102 (wherein the mail client 105 may be part of the recipient unit 102). Furthermore, the sender unit 101 may send a sending information message 106 to the control unit 103 indicating that the sender unit 101 has sent the electronic message 104 to the recipient unit 102.

Furthermore, the recipient unit 102 can receive the electronic message 104 directly from the sender unit 101 and may send a receipt information message 107 to the control unit 103, wherein the receipt information message 107 indicates that a user of the recipient unit 102 has received the electronic message 104.

A user of the sender unit 101 creates an email 108 and chooses to send the email 108 by means of the communication system 100. A creator entity of the sender unit 101 may then generate an email with the attached container-file 104. This container-file 104 comprises the complete email 108 in encrypted form. For this purpose, an encryption key 109 is used in the user unit 101. The container-file 104 contains the message including attachments. To allow for a document integrity check, the creator entity may calculate a hashcode of the complete container-file 104.

Furthermore, the creator entity of the sender unit 101 establishes a connection to the control unit 103 (a server) and authenticates with the user name and password of the user of the sender unit 101. In this context, the message 106 may include the transmission of the container-file hashcode, a recipient, a subject, an encryption key 109 and any other necessary information.

The sending information message 106 is sent to the server 103 holding every information needed for a transaction. The control unit 103 authenticates the user of the sender unit 101 and/or of the recipient unit 102 and checks against correct hashcodes and passwords. The control unit 103 may further send the key 109 to the recipient unit 102 for decryption of container-files to the legitimate recipient.

After reception of the email 104 by the mail client 105 of the recipient unit 102, the recipient unit 102 receives the email containing the attached container-file 104 which the user of the recipient unit 102 can now open. Once the user of the recipient unit 102 opens the file 104, a reader may get started automatically. Before the first use, it is possible that the reader may have to be installed locally on the recipient unit 102.

After a user of the recipient unit 102 has opened the container-file 104, the reader connects to the server 103 and authenticates the user of the recipient unit 102. Then, the reader of the recipient unit 102 may calculate the hashcode of the received container-file 104 and may ask a server 103 for the key 109 to decrypt.

When the authentication of the recipient unit 102 is accepted by the control unit 103, the key 109 is sent from the control unit 103 to the recipient unit 102.

Furthermore, the control unit 103 may send a confirmation message 110 to the sender unit 101. Upon the delivery of the key 109, the server 103 sends the email 110 to the sender unit 101 that confirms the delivery of the decryption key 109 to the recipient unit 102. This confirms that the recipient unit 102 received and opened the complete and non-manipulated email 104.

After receipt of the key 109, the container-file 104 can get decrypted by the recipient unit 102 and its contents can be extracted. Finally, the container-file 104 and messages contained therein can be opened to get access to the content 111 of the file 104.

In the following, referring to FIG. 2, a provider system 200 for secured email according to an exemplary embodiment of the invention will be described.

Figure 2:
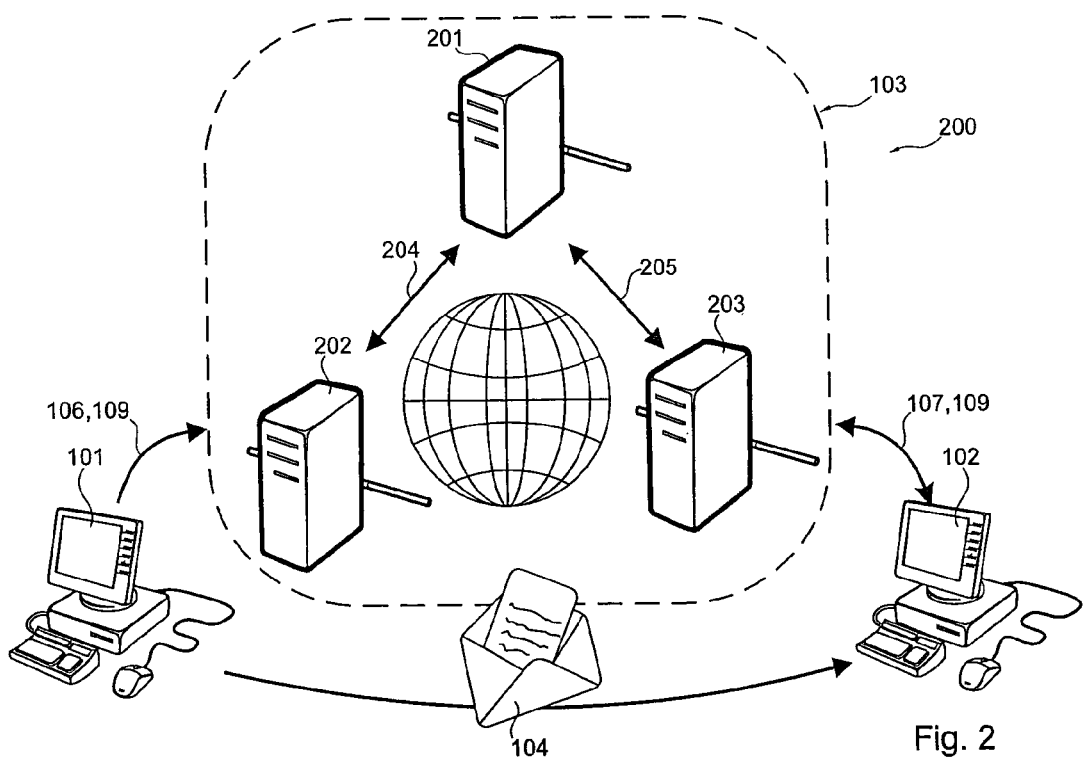
FIG. 2 shows a communication system according to another exemplary embodiment of the invention.

In the embodiment of FIG. 2, the control unit 103 is subdivided in a first control entity 202 (a first provider server) communicatively coupled to the sender unit 101 in a manner that a transmission of the sending information message 106 (comprising a decryption key 109 adapted to decrypt the encrypted electronic message 104) from the sender unit 101 to the first control entity 202 is indicative of an identity of a user of the sender unit 101.

The control unit 103 further comprises a second control entity 201 (a clearing server) communicatively coupled to the first control entity 202. The first control entity 202 is adapted to forward an anonymous sending information message 204 to the second control entity 201 in a manner that the second control entity 201 is not aware of the identity of the user of the sender unit 101.

Moreover, the control unit 103 comprises a third control entity 203 (a second provider server) communicatively coupled to the recipient unit 102 in a manner that a transmission of a recipient message 107, 109 between the recipient unit 102 and the third control entity 203 is indicative of an identity of a user of the recipient unit 102. The recipient message 107, 109 may comprise a decryption key adapted to decrypt the encrypted electronic message 104.

The third control entity 203 is communicatively coupled to the second control entity 201, wherein the second control entity 201 is adapted to exchange data 205 with the third control entity 203 in a manner that the second control entity 201 is not aware of the identity of the user of the recipient unit 102.

Thus, the communication system 200 is an anonymous transaction management system, more particularly an anonymous clearing system.

The clearing unit 201 allows for a management of the key transaction in an anonymous way. The key data is transmitted anonymously upon receipt from the first control entity 202 or upon request from the third control entity 203. Only the provider servers 202, 203 which may offer their services independently from the intermediating clearing unit 201 know the identities of their respective clients 101, 102. Therefore, the key exchange handled by the clearing unit 201 is anonymous, whereas the first control entity 202 knows data characterizing its client 101 and the third control entity 203 knows data characterizing its client 102. The clearing unit 201 is a "trusted party" which carries out key related transactions without knowing the identity of the communicating instances 101, 102.

A successful transmission of the decryption key from the second control entity 201 to the third control entity 203 and from there to the recipient unit 102 may result in the transmission of a notifier or confirmation message from the third control entity 203 or from the recipient unit 102 to the second control entity 201 or to the first control entity 202 or to the sender unit 101.

A transaction history indicating any communication between the first control entity 202 and the second control entity 201 may be stored in memories of both entities 202, 201 in a manner that any communication can be retraced later. Accordingly, a transaction history indicating any communication between the third control entity 203 and the second control entity 201 may be stored in memories of both entities 201, 203 in a manner that any communication can be retraced later. Thus, when considering the transaction histories, it will be possible to reconstruct any communication including the identity of the sender unit 101 stored in the first control entity 202 and/or the identity of the recipient unit 102 stored in the third control entity 203.

In the following, several aspects of the communication system 200 will be described in further detail.

By the clearing system 200, an essentially unlimited number of (two, three or more) providers 202, 203 can be supported:

- this allows for global availability of this secured email system 200 through different (two, three or more) users 101, 102
- the first user 101 can send a secured email 104 to the second user 102 who can access it even if the first user 101 and the second user 102 use the service of different service providers 202, 203 service providers 202, 203 maintain privacy of their relationships with customers (sender 101, recipient 102)

the clearing service unit 201 only handles anonymous transaction data 204, 205 and does not have access to any customer data.

The clearing system 200 may be organized in three layers:

In a user-layer 101, 102, the applications "creator" and "reader" may be used to create, send and read the messages 104, 106, 107, 109.

In a provider-layer, a provider 202, 203 runs the server-application to which all users 101, 102 connect (provider-server). The provider 202, 203 also organizes and manages the customer-data and all data necessary for the system 200.

The providers 202, 203 may communicate with a clearing-layer 201 to exchange transaction information. Every provider 202, 203 sends (or receives) information 204, 205 needed to manage a new transaction anonymous to the clearing instance 201.

In the clearing-layer 201, the anonymous transactions of each provider 202, 203 is managed to guarantee exchange of transaction information across providers 202, 203.

The clearing system 201 may hold the following information:

Hashcode of the transaction container to verify correct transmission and message Key to decrypt the message (transaction-key)

Hashcode of the recipient mail address to verify the correct recipient

Identification code to handle the management of transactions

Date for transaction timeout

Information about the sender (authentication-state)

Identification code of the sending provider

Next, it will be described how the recipient 102 of an email will get access to this email.

If a provider server 203 receives the request for a transaction-key from a recipient user 102, it will send a request 205 to the clearing server 201 by submitting the hashcode of the message. The clearing server 201 will deliver the key, hashcodes, recipient-hashcodes and other information about each active transaction that corresponds to the hashcode submitted by the provider 203 of the recipient 102. The provider 203 loops through these results and compares the hashcodes of the recipient's mail addresses with the hashcodes returned by the clearing server 201. If there is a match, the provider 203 of the recipient 102 will deliver the key to the recipient 102 and will confirm commitment of the delivery to the clearing server 201. The clearing server 201 stores this commitment into a special notification-table assigned to each of the providers 202, 203.

Every provider 202, 203 requests its current notification-table in a short interval. If the provider-server 202, 203 receives such a notification, it may trigger a notification to the sending user 101 about the successful delivery of this transaction.

In the following, a feature related to enforcing document attachments will be explained.

The system 200, more particularly the provider-server 202, may optionally offer the possibility to force the creator 101 to add attachments.

According to an exemplary embodiment, this can not be avoided by the user 101 and is managed by the administrator of the provider-server 202. Using this mechanism, the creator 101 can be forced to add digitally signed certificates of authority.

Actually, it may be the provider-server 202 which enforces the addition of the attachment. Furthermore, the feature of a mandatory attachment is optional and may be activated or deactivated by a user or a system administrator. Optionally, a provider may leave it to the disposition of a user to activate or deactivate the feature of a mandatory attachment (for instance via a web interface). Moreover, a user may define a sub-user (secondary user). Then, it is possible to assign the documents to the sub-user who cannot avoid the attachment or alter a corresponding setting.

Those certificates may include rights and restrictions maintained by the organizations of which the user 101 is a member, for instance for orders or some competence restrictions of the user 201, such as "user is allowed to buy goods up to a value of . . . ".

A benefit is that no user of this provider-server 202 needs software to manage certificates, blocking lists or some hardware to read smartcards for digital signature. In fact, the user 101 even does not need to gather a legally binding PKI certificate at all. Every message sent by the user 101 is signed in a legally binding manner by the company by the added and digitally signed certificate of authority.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A communication system, comprising:

a sender node;

a recipient node; and a plurality of control entities in communication with the sender node and the recipient node;

wherein the sender node is adapted to generate an electronic message to be transmitted to the recipient node and to send a sending information message to one of the control entities indicating that the electronic message is transmitted to the recipient node;

wherein the recipient unit node is adapted to receive the electronic message and to send a receipt information message to the control node, the receipt information message indicating that a user of the recipient node has received the electronic message;

wherein the sender node is adapted to generate the electronic message as an encrypted electronic message by encrypting electronic data;

wherein a first control entity is communicatively coupled to the sender node in a manner that a transmission of a sender message from the sender node to the first control entity is indicative of an identity of the sender node;

wherein the sender message includes decryption key information;

wherein a second control entity is communicatively coupled to the first control entity;

wherein the first control entity is adapted to forward the sender message to the second control entity in a manner that the second control entity is not aware of the identity of the sender node;

wherein a third control entity is communicatively coupled to the recipient node in a manner that a transmission of a recipient message between the recipient node and the third control entity is indicative of an identity of the recipient node;

wherein the recipient message comprises a decryption key adapted to decrypt the encrypted electronic message;

wherein the third control entity is communicatively coupled to the second control entity;

wherein the third control entity is adapted to exchange data with the second control entity in a manner that the second control entity is not aware of the identity of the recipient node;

wherein the second control entity is a clearing server adapted to manage a decryption key transaction in an anonymous way; and wherein the first control entity is a provider-server and the third control entity is a provider-server.

2. The communication system according to claim 1, wherein the sender node is adapted to notify an event that a user of the recipient node has accessed the electronic message.

3. The communication system according to claim 1, wherein the sender node is adapted to notify an event that a user of the recipient node has not accessed the electronic message during a time interval exceeding a predetermined threshold time interval.

4. The communication system according to claim 1, wherein the sender message is the sending information message, particularly is a sending information message comprising a decryption key adapted to decrypt an encrypted electronic message.

5. The communication system according to claim 1, wherein the recipient message comprises the receipt information message.

6. The communication system according to claim 1, wherein at least one of the group consisting of the first control entity and the third control entity is a provider server.

7. The communication system according to claim 1, wherein the first control entity and the third control entity are different provider servers.

8. The communication system according to claim 1, adapted as an anonymous transaction management system, particularly as an anonymous clearing system.

9. The communication system according to claim 1, wherein at least one of the group consisting of the sender node, the recipient node, and the control node is adapted for preventing accessibility to information included in the electronic message in case that a predetermined attachment to the electronic message is lacking.

10. The communication system according to claim 1, wherein the sender node is adapted for mandatorily attaching a predetermined attachment to the electronic message.

11. The communication system according to claim 9, wherein the predetermined attachment comprises at least one of the group consisting of an identification of a user of the sender node, an authentication of a user of the sender node, an obligation of a user of the sender node, and a logo characterizing a user of the sender node.

12. A communication method using a plurality of control entities comprising, a first control entity, a second control entity communicatively coupled to the first control entity, the second control entity being a clearing server, and a third control entity communicatively coupled to the second control entity, the first control entity being a first provider-server and the third control entity being a second provider-server, the method comprising:

generating with a sender node, an electronic message as an encrypted electronic message by encrypting electronic data, transmitting the electronic message to a recipient node, communicatively coupling the first control entity to the sender node in a manner that a transmission of a sender message from the sender node to the first control entity is indicative of an identity of the sender node, wherein the sender message includes decryption key information, communicatively coupling the third control entity to the recipient node in a manner that a transmission of a recipient message between the recipient node and the third control entity is indicative of an identity of the recipient node, sending a sending information message from the sender node to the clearing server indicating that the electronic message is transmitted to the recipient node;

forwarding, by the first control entity, the sender message to the second control entity in a manner that the second control entity is not aware of the identity of the sender node, receiving, with the recipient node, the electronic message, sending a receipt information message from the recipient node to the clearing server, the receipt information message indicating that a user of the recipient node has received the electronic message, wherein the recipient message comprises a decryption key adapted to decrypt the encrypted electronic message;

wherein the third control entity is adapted to exchange data with the second control entity in a manner that the second control entity is not aware of the identity of the recipient node; and wherein the second control entity is a clearing server with a processor and a storage device adapted to manage a decryption key transaction in an anonymous way.

13. A communication system, comprising:

a first provider-server;

a clearing server with a processor and a storage device, the clearing server communicatively coupled to the first provider-server; and a second provider-server communicatively coupled to the clearing server;

wherein the first provider-server is adapted to receive a sending information message from a sender node, the sending information message indicating that an electronic message is transmitted to a recipient node, and wherein the second provider-server is adapted to receive a receipt information message from the recipient node, the receipt information message indicating that a user of the recipient node has received the electronic message;

the first provider-server communicatively coupled to the sender node in a manner such that a transmission of a sender message from the sender node to the first provider-server is indicative of an identity of the sender node;

wherein the sender message includes decryption key information;

the first provider-server adapted to forward the sender message to the clearing server in a manner that the clearing server is not aware of the identity of the sender node;

the second provider-server communicatively coupled to the recipient node in a manner that a transmission of a recipient message between the recipient node and the second provider-server is indicative of an identity of the recipient node;

wherein the recipient message comprises a decryption key adapted to decrypt the encrypted electronic message; and wherein the second provider-server is adapted to exchange data with the clearing server in a manner such that the clearing server is not aware of the identity of the recipient node.

* * * * *